Aug. 8, 1944.  E. H. MALLORY  2,355,226
UNLOADING APPARATUS
Filed Dec. 22, 1943  2 Sheets-Sheet 2
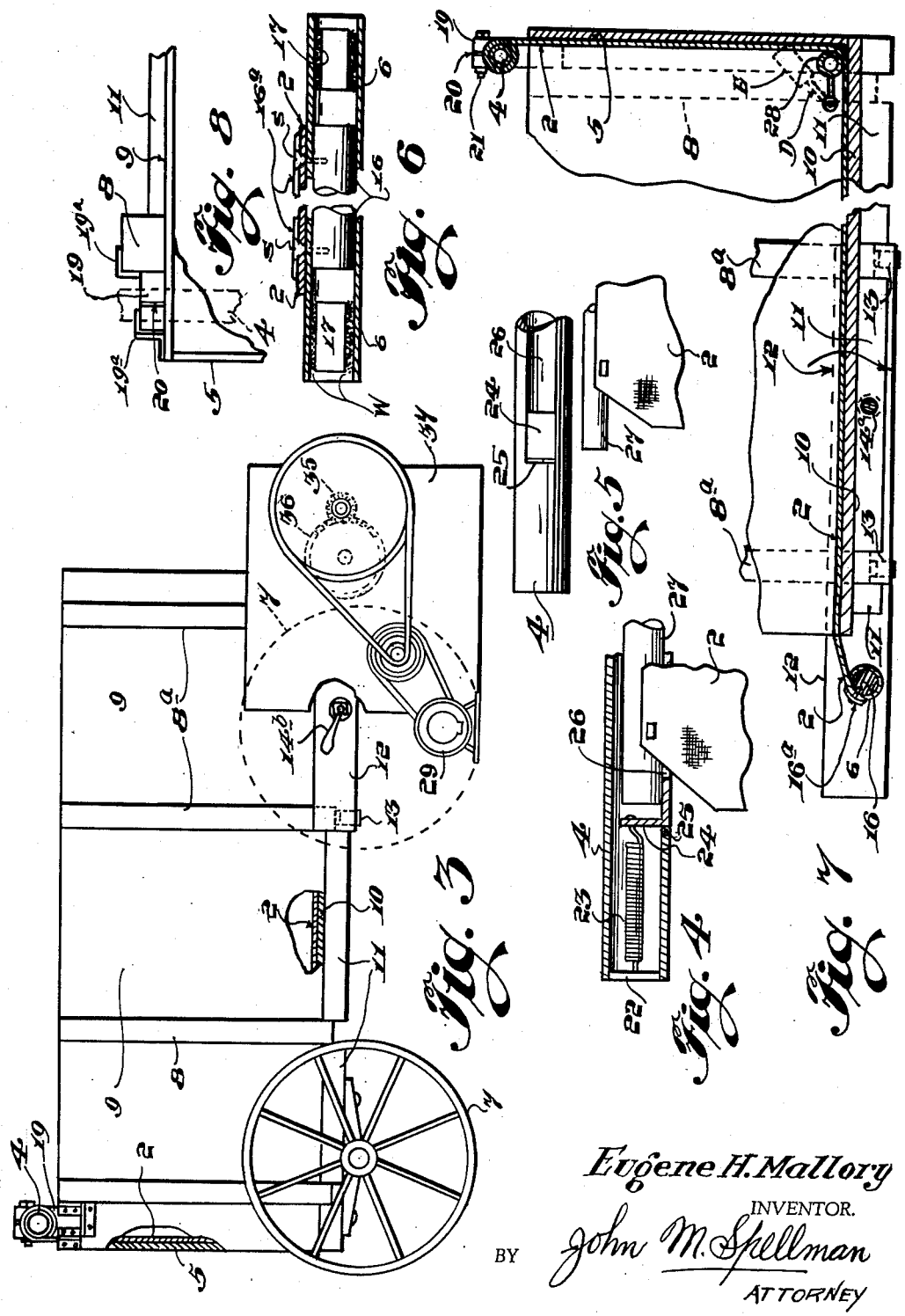
Eugene H. Mallory
INVENTOR.
BY John M. Spellman
ATTORNEY Patented Aug. 8, 1944

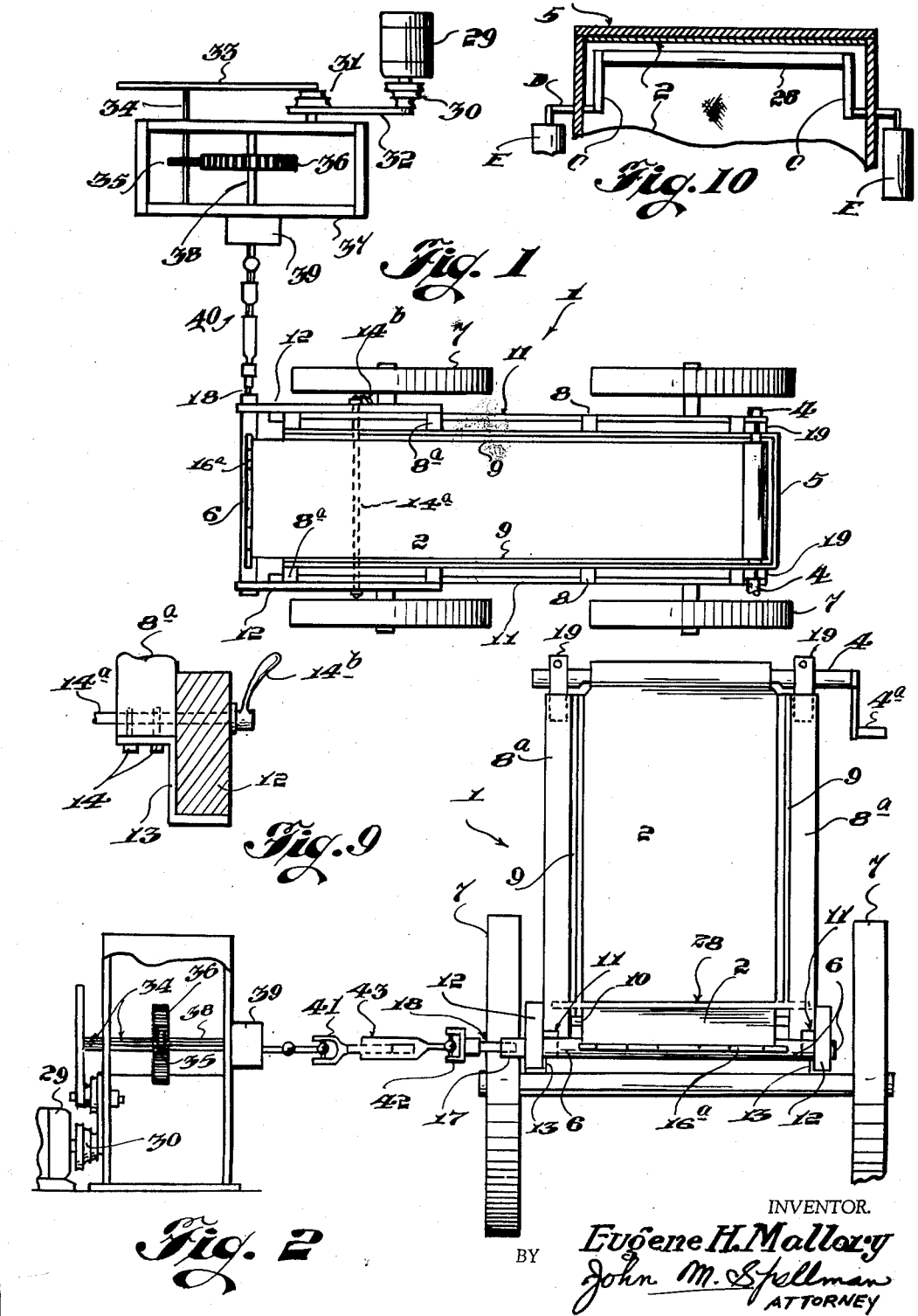

2,355,226

UNITED STATES PATENT OFFICE 2,355,226

UNLOADING APPARATUS

Eugene H. Mallory, Hampton, Iowa

Application December 22, 1943, Serial No. 515,259

9 Claims. (Cl. 214—83)

This invention relates to unloading apparatus or a system for the mechanical unloading of field cut hay, bedding and ensilage, and similar field crops, also grain.

The primary object of the invention is the provision of an apparatus which may be operated with a field cutter, wherein the cut material is deposited from the field cutter to the unloading apparatus embodying the invention. In this connection, the invention aims to provide a simple, inexpensive and durable apparatus, mounted on wheels, and consisting of a suitable rack, with a traveling canvas, by means of which the gathered crop, after being deposited on the canvas, is directed into the path of a blower trough and thus blown or placed in a barn.

Another important object of the invention is the provision of an apparatus of this nature which may be used with any truck, trailer or wagon, the only requirements being that the box or rack be free of internal braces, cleats, or other projections, and that the entire end gate be removable.

The invention also includes the advantage of enabling the traveling canvas and its related parts to be easily placed on or removed from a wagon without the use of tools; means for varying the speed of the unloading mechanism; and for variation in the differences between racks or for "spotting" the truck or wagon.

The invention will be clearly understood from a perusal of the following detailed description, taken in connection with the accompanying drawings, and in the drawings:

Figure 1 is a top plan view of an apparatus embodying the invention and illustrating the same in an unloading position;

Figure 2 is an end elevational view, partly broken away, and on a slightly larger scale;

Figure 3 is a side elevational view, partly sectioned and partly broken away, one wheel being indicated by broken lines;

Figure 4 is an enlarged detail, longitudinal fragmentary sectional view of one end of the front or "take-up" drum, showing manner of securing the canvas thereto;

Figure 5 is a view similar to Figure 4, but showing the slotted side of the drum, and the canvas retainer removed therefrom;

Figure 6 is a fragmentary, sectional, detail side elevational view of the rear or delivery drum in broken formation;

Figure 7 is a fragmentary, sectional, detail view, in broken formation, of one side of the wagon box, showing "take-up" drum, wind-up drum, canvas, and manner of assembly;

Figure 8 is a detail, top plan view of one corner of the wagon box, showing the manner of removably seating the "take-up" drum;

Figure 9 is an enlarged detail view of one of the wagon posts, hanger, and part of the removable rack assembly, showing mode of connection; and Figure 10 is a fragmentary, horizontal detail view of an adjustable intermediate roller.

In carrying out the invention and as illustrated in Figures 1 and 2 there is provided a wagon, indicated generally at 1, although this may be a truck having a wagon box with side walls, front end wall, with removable end-gate. The means for moving the gathered crop, which may include any kind of crop, such as hay, ensilage or any material of which the apparatus may handle, consists of a traveling canvas or similar flexible medium 2. This may consist of a single width of cloth 2 which extends normally from a "take-up" drum 4, disposed just above the front wall 5 of the wagon against which it is adapted to move, and a rear or delivery drum 6, the latter drum having the canvas permanently secured thereto, while the canvas is released from the wind-up drum as the load is delivered into a blower trough—these parts being hereinafter described more in detail.

To provide a box for the apparatus, which is of course mounted on wheels, such as 7, there are provided four posts 8 and 8—a to which the side walls 9 and front wall 5 are nailed or secured in any suitable manner. The only requirement in this respect is that the walls be free of obstructions on the inside of the box so that the material and traveling canvas may have no obstructions. A bed 10 (see Figure 7) is secured to the walls 5 and 9, and the posts 8 are provided with spacers, or means for aiding in holding them upright by the 2 x 4 pieces indicated at 11. The rack assembly includes pieces of 2 x 6 indicated at 12. The pieces 12, however, are only supported by the posts 8—a as this portion of the rack is removable, as hereafter described. In Figure 9 is shown the preferred mode of securing the pieces 12 to the posts 8—a which is by placing the 2 x 6 pieces in the hangers or angle irons indicated at 13, these hangers being secured as shown to the bottoms of the posts 8—a, see Figure 9. Then a brace or retaining rod 14—a with a hand nut 14—b is placed through the 2 x 6 pieces 12 and tightened by the nut 14—b. The pieces 12, see Figure 7, extend beyond the wagon bed 10 to provide a support for the delivery drum 6, see detail in Figure 6.

The delivery drum consists of a pipe section 6 into which is driven a shaft 16 for reinforcement. This shaft extends to about six inches of the ends of the section 6. In each end of the pipe 6 is welded, as at W, a short section of tubing 17 which is square in cross-section and which thus provides an inner socket. The canvas 2 is fastened to the shaft 16 by flat headed stove bolts S, tapped into the pipe section 6 and the shaft. The socket in tubing 17 is for receiving a square drive shaft 18, referred to later. Of course it will be understood that the drum 6 (or pipe section with its inner shaft) is cylindrical except at the points referred to in order that it may rotate freely in the pieces 12—this drum being below the plane of the wagon bed 10.

The take-up drum 4 is also constructed of piping, and is mounted in two blocks 19, which are slit as at 20 and a bolt 21 placed across the slit to adjust the drum to the proper rotating movement without binding. Angle irons 19—a support the blocks which may be removed. Figures 4 and 5 show the construction of this drum and wherein it will be seen that in each end portion of the drum (only one end being shown) is a pin 22 holding one end of a spring 23, the opposite end of this spring being secured to a yieldably swinging member 24, hinged to the drum at 25. The drum has a longitudinal opening 26 through which a rod 27 is placed and onto which the canvas 2 is secured. Thus when the load, crop is being delivered a continued pull of the rear shaft exerts tension on the rod and members 24 and the rod to which the canvas is attached is freed and is carried along with the load until the latter has been entirely delivered or moved into the path of a blower (not shown). An adjustable, intermediate roller 28 maintains the travel of the canvas 2 in a vertical position against the front wall 5 and horizontally along the floor 10. This roller consists of a pipe length, supported by the arms C, secured to a pivot bolt D passing through the sides of the box, this bolt being rigidly secured to a weight E, on the outside of the box, see Figures 7 and 10. The weights hold the pipe against the front wall of the box, in the position shown by dotted lines, Figure 7, but permit the roller to swing backwardly and upwardly for passage of the canvas end rod 27 or for resetting. It is not necessary for the roller to rotate.

In Figures 1, 2 and 3 are shown the power means for drawing the load to the delivery end of the apparatus. This consists of a motor 29 of preferably one-half horse power and the reduction pulleys 30 and 31 connected by a V-belt 32 adapted to drive a 26 inch pulley 33. The pulley 33 has a shaft 34 on which is mounted a starter pinion gear 35 in mesh with a geared fly wheel 36, these two gears being supported in a housing 37. A pilot shaft is indicated at 38. On the housing is mounted a transmission 39. The drive shaft assembly 40 is of the slip tube type having 2 universal joints 41 and 42, the slip tube being shown at 43. The end of the shaft 18 being square in cross-section is thus adapted to slip in the square tube portion 17 of the rear drum 6 in setting or "spotting" the power unit to the apparatus, when the load is ready to be blown into a store house or barn. Obviously the power take-off of a truck may be utilized to rotate the shaft assembly 40 if desired.

In operation, a field cutter, such as hereinbefore referred to, may be employed, and the material loaded into the wagon—the canvas 2 having previously been wound up on the forward drum by the crank arm 4—a. When a load has been gathered the wagon is moved to the power unit and the shaft 18 inserted in the socket of the shaft 6 at 17. If the "spotting" is not accurate the inaccuracy is taken care of by the slidable portion or slip tube 43.

A blower or other means is then employed to deposit the material in a barn or the storage house. When the load has been delivered by the travel of the canvas along the floor of the box, the pull of the rear drum causes the members 24 to swing open and release the rod 27. However, it is not absolutely necessary for the entire forward portion of the canvas to be removed from the forward drum 4, as in some instances it may only be partly unwound.

While the disclosure presents a practical working embodiment of the invention, obviously changes and modifications may be made therein such as would be within the range of the inventive thought and which may be said to come fairly within the scope and meaning of the appended claims.

What is claimed is:

1. An apparatus for unloading gathered crop material from a wagon having a box with side walls, a front wall and removable end-gate, comprising a drum located above the front wall of the wagon box, a drum disposed at a point beyond the rear end of the wagon box, an intermediate roller; a flexible medium spanning the width of the box and connected to the drums to provide a travelling element to carry the material to the rear drum as the load is being removed from the wagon, a rack assembly for removably supporting the rear drum, means for removably supporting the forward drum, means for securing the flexible travelling element to the drums; a power unit, means for adjustably and operably connecting the power unit to the rear drum, and means for automatically releasing the travelling medium from the front drum as the load is removed from the wagon box.

2. An apparatus as claimed in claim 1, said forward drum having a longitudinal slot, swingable members to close each end of the slot, a cylindrical member carried in the drum to which the travelling element is secured, whereby a pull on the travelling element will open the swingable members and release the forward end of the travelling element when the load has been removed.

3. An apparatus as claimed in claim 1, said forward drum including a crank arm for winding the travelling element to a start position, said forward drum being supported on blocks which are capable of removal and having adjustable means against binding in rotation.

4. An apparatus as claimed in claim 1, said rear drum including a reinforcing rod, each end of the drum having a socket of square cross-section to complementally receive one end of the drive shaft of the power unit; the travelling element being secured to the reinforcing rod and to the drum by a longitudinal steel strip and bolts, said bolts passing through the wall of the drum into the rod.

5. An apparatus as claimed in claim 4, said intermediate roller disposed below the forward drum to hold the travelling element in vertical and horizontal positions, said roller being adjustable by arms secured to the ends of the roller, the arms passing outside the wagon box and weights secured thereto to thereby enable the roller to be swung against and away from the travelling element in the unloading and resetting of the apparatus.

6. An unloading apparatus of the character described, adapted for use with a wagon box, comprising a revoluble drum mounted at the front end of the box and on a plane above the floor of the wagon box, and a revoluble drum mounted at the rear end of the wagon box and below the floor thereof, a flexible traveling medium connected to the drums, said medium adapted to travel on a horizontal and in a vertical direction, with means for winding and unwinding the medium onto one drum and off the other drum in conveying material to a point of discharge from the wagon box, and including power means for rotating the rear drum.

7. An unloading apparatus of the character described, adapted for use with a wagon box, comprising a revoluble drum mounted at the front end of the box and on a plane above the floor of the wagon box, and a revoluble drum mounted at the rear end of the wagon box and below the floor thereof, a flexible traveling medium connected to the drums, said medium adapted to travel on a horizontal and in a vertical direction and offering sufficient elasticity in cooperation with the load to gradually overcome the inertia of the load by moving one end of the latter before the other end thereof is set in motion; and including means for winding and unwinding the medium onto one drum and off the other drum, and having power means for rotating the rear drum.

8. An unloading apparatus as claimed in claim 7, which includes a rack assembly for removably securing and detaching the drums and flexible medium to the wagon box, and means for connecting and disconnecting the power means to the rear drum; the flexible medium, when subjected to a pulling movement, relieving frictional contact with the sides of the wagon box on account of said elasticity.

9. An apparatus as claimed in claim 6, said power unit means for controlling and varying the speed imparted to the rear drum, and means for varying and adjusting the power unit drive shaft assembly to accommodate accurate "spotting" of the wagon box to the power unit.

EUGENE H. MALLORY.